(12) United States Patent
Moles et al.

(10) Patent No.: US 9,869,998 B2
(45) Date of Patent: Jan. 16, 2018

(54) WIRELESS DATA COMMUNICATIONS BETWEEN A REMOTELY OPERATED VEHICLE AND A REMOTE LOCATION

(71) Applicants: Peter Moles, Cypress, TX (US); Mark Alan Stevens, Houston, TX (US); Kevin Frances Kerins, The Woodlands, TX (US)

(72) Inventors: Peter Moles, Cypress, TX (US); Mark Alan Stevens, Houston, TX (US); Kevin Frances Kerins, The Woodlands, TX (US)

(73) Assignee: OCEANEERING INTERNATIONAL, INC., Houston, TX (US)

(*) Notice: Subject to any disclaimer, the term of this patent is extended or adjusted under 35 U.S.C. 154(b) by 0 days.

(21) Appl. No.: 14/593,535

(22) Filed: Jan. 9, 2015

(65) Prior Publication Data
US 2015/0192925 A1    Jul. 9, 2015

Related U.S. Application Data

(60) Provisional application No. 61/925,406, filed on Jan. 9, 2014.

(51) Int. Cl.
*G08C 17/02* (2006.01)
*G05D 1/00* (2006.01)
(Continued)

(52) U.S. Cl.
CPC .......... *G05D 1/0022* (2013.01); *G01S 5/0009* (2013.01); *G08B 29/16* (2013.01); *G08C 17/02* (2013.01); *H04B 1/38* (2013.01); *H04L 67/12* (2013.01); *B63G 2008/005* (2013.01); *B63J 2099/008* (2013.01);
(Continued)

(58) Field of Classification Search
CPC . G08B 29/16; H04L 2209/805; H04L 67/025; H04L 67/12; B63J 2099/008; G01S 5/0009; G08C 17/02; G08C 2201/40; G08C 2201/51; H04B 1/38; H04B 1/44; G05D 1/0022; B63G 2008/005
See application file for complete search history.

(56) References Cited

U.S. PATENT DOCUMENTS 5,579,285 A * 11/1996 Hubert .................. G01S 5/0009
                                                    367/133
6,058,071 A *  5/2000 Woodall ................. H04B 13/02
                                                    367/134
(Continued)

*Primary Examiner* — Jason Holloway
(74) *Attorney, Agent, or Firm* — Maze IP Law, PC

(57) ABSTRACT

A remote control system for controlling a remotely operated vehicle (ROV) may comprise an ROV wireless transceiver operatively in communication with one or more wireless transceivers deployed at a distance from the ROV. The remote wireless transceivers are operatively in communication with one or more ROV consoles and ROV may be operated from the remote location by operatively connecting the first ROV console to a second wireless data transceiver; establishing wireless data communications between the second wireless data transceiver and the ROV wireless transceiver; and controlling a predetermined ROV function at the ROV from the first ROV console via communications established between the second wireless data transceiver and the ROV wireless transceiver. Two or more such remote wireless data transceivers and/or remote ROV consoles may be provided for redundancy, ancillary functions, or the like.

19 Claims, 2 Drawing Sheets

(51) Int. Cl.
  *G08B 29/16* (2006.01)
  *G01S 5/00* (2006.01)
  *H04B 1/38* (2015.01)
  *H04B 1/44* (2006.01)
  *B63J 99/00* (2009.01)
  *H04L 29/08* (2006.01)
  *B63G 8/00* (2006.01)

(52) U.S. Cl.
  CPC ..... *G08C 2201/40* (2013.01); *G08C 2201/51* (2013.01); *H04B 1/44* (2013.01); *H04L 67/025* (2013.01)

(56) References Cited

U.S. PATENT DOCUMENTS

| | | | | |
|---|---|---|---|---|
| 6,933,884 B2* | 8/2005 | Martin | ............... | B63B 49/00 342/357.55 |
| 7,200,358 B1* | 4/2007 | Newman | ............... | H04B 1/38 455/11.1 |
| 9,213,077 B2* | 12/2015 | Kieffer | ............... | G01S 19/18 |
| 2004/0217900 A1* | 11/2004 | Martin | ............... | B63B 49/00 342/357.55 |
| 2006/0286931 A1* | 12/2006 | Rhodes | ............... | H04B 13/02 455/40 |
| 2007/0208521 A1* | 9/2007 | Petite | ............... | G08C 17/02 702/62 |
| 2009/0153354 A1* | 6/2009 | Daussin | ............... | E21B 47/12 340/853.1 |
| 2010/0090822 A1* | 4/2010 | Benson | ............... | G05B 13/0275 340/508 |
| 2010/0227552 A1* | 9/2010 | Volanthen | ............... | H04B 13/02 455/40 |
| 2011/0095914 A1* | 4/2011 | Velado | ............... | B63J 99/00 340/984 |
| 2014/0266793 A1* | 9/2014 | Velado | ............... | G08B 25/08 340/870.16 |

* cited by examiner

WIRELESS DATA COMMUNICATIONS BETWEEN A REMOTELY OPERATED VEHICLE AND A REMOTE LOCATION

RELATION TO OTHER APPLICATIONS

This application claims priority through U.S. Provisional Application 61/925,406, filed Jan. 9, 2014.

BACKGROUND

There are times when it may be necessary to effect control and/or gather data from a remotely operated vehicle (ROV) becomes problematic such as when an offshore device such as a rig needs to be abandoned due to an emergency such as weather, equipment failures, or the like. Although typically controlled from that site locally, the ROV may still need to be controlled but no one may be present to control the ROV.

DRAWINGS

Various figures are included herein which illustrate aspects of embodiments of the disclosed inventions.

DESCRIPTION OF EXEMPLARY EMBODIMENTS

It may be desirable, for numerous reasons, to operate a remotely operated vehicle (ROV) from a location remote from the ROV such as a non-local vessel, rig, or shore-based operation, including using over high or low latency wireless communication. This enables a crew to remotely operate a workclass or observation ROV safely from another vessel/rig should operating the ROV become unsafe (such as an abandoned platform) for field monitoring, rig monitoring, blowout preventor (BOP) monitoring, BOP closure, LMRP disconnection, general well support, and the like, and/or if safety concerns arise such as weather or environmental conditions make operations hazardous near the ROV. Such remote locations may allow, for example, operation of an ROV from a shore location if immediate support vessels are unavailable. Doing so allows that remote crew to provide supplemental mission support from other vessels/rigs for long duration tasks, complex tasks, trouble shooting and/or diagnostics, or the like.

Additionally, if a rig is endangered and/or evacuated, using the disclosed system can allow the ROV to be operated from remote location, as disclosed herein. In certain embodiments, using the disclosed system also allows ROV operations to be controlled from a remote location such as a shore-based location as a primary means and/or for performing low-involvement operations while the main operator is otherwise unavailable.

If and as necessary, transmission of wireless data can be effected and received by a complementary wireless data transceiver located at a distance from the rig such as another rig, vessel located at a distance, or a shore-based facility. When and as needed, a second console located at that remote site can assume control of the ROV, including receiving data, including video, and sending data such as control data to control the ROV and its operations. As will be familiar to those of ordinary skill in these arts, the distance between the rig and remote site will be dictated or otherwise influenced by factors such as data transmission frequencies, weather, and the like.

Accordingly, using the disclosed system, an ROV console is typically located in close proximity to the ROV to be controlled, e.g. on the rig from where the ROV is deployed but, as disclosed herein, a backup, secondary, or even primary ROV console may be deployed remotely and a wireless data transceiver operatively placed in communication with the ROV control system where switching from a primary to and from a backup or secondary ROV control console may occur automatically or manually.

Figure 1:
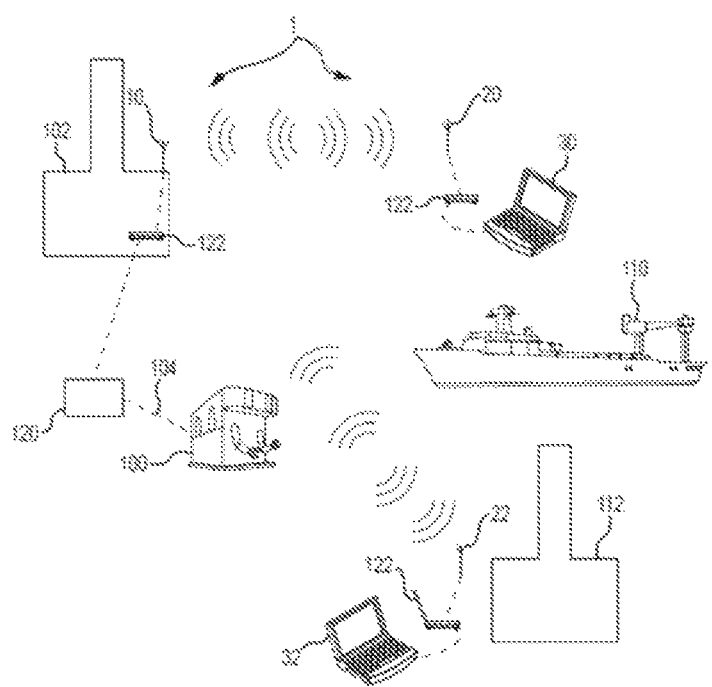
FIG. 1 is a block diagram of an exemplary system.
Figure 2:
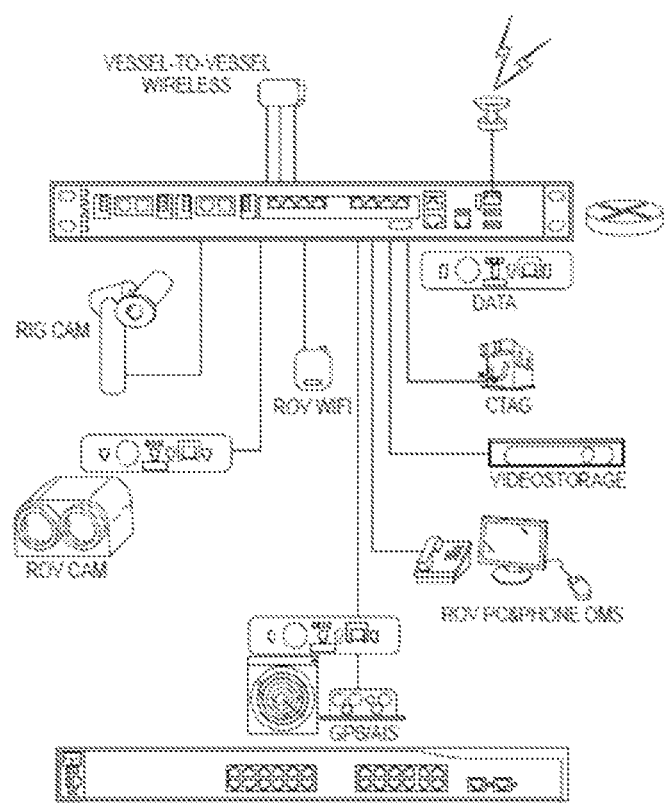
FIG. 2 is a block diagram of various functional and operational connections.

Referring now FIG. 1, system 1 for operating a remotely operated vehicle (ROV) from a remote location comprises ROV wireless data transceiver 10, adapted to be deployed in ROV 100; second wireless data transceiver 20 disposed at a predetermined position remote 110 from but proximate to ROV 100 to be controlled and configured to wirelessly communicate with ROV wireless data transceiver 10; and first ROV console 30 disposed at predetermined position remote 110.

Additionally, control point 120 may be present, as will be familiar to those of ordinary skill in the underwater ROV arts, disposed intermediate ROV 100 and ROV wireless data transceiver 10.

ROV wireless data transceiver 10 may be located in, on, or proximate to ROV 100; in, on, or proximate to control point 120; or at a distance from ROV 100, e.g. rig 102.

As will be familiar to those of ordinary skill in the data communications arts, required equipment may be disposed intermediate ROV 100 and ROV wireless data transceiver 10, e.g. one or more hubs, switches, and/or routers such as router 122. As will be familiar to those of ordinary skill in the data communications arts, transceivers 20 and 30 may be single or multiband transceivers with one or more operative antennae, e.g. MIMO omnidirectional antennae.

Predetermined position 110 typically is a location in close proximity to ROV 100 and may be a location in close proximity to ROV 100 such as rig 102 from where ROV 100 was deployed, rig 112, which is a rig other than rig 102 from where ROV 100 was deployed, non-local vessel 110, a shore-based operation, or the like. In some embodiments, predetermined position 110 is dictated or otherwise influenced by factors such as acceptable and/or obtainable data transmission frequencies, weather, and the like, or a combination thereof.

ROV console 30 is operatively in communication with second wireless data transceiver 30, e.g. wirelessly such as through a Wi-Fi connection, wired, or the like, or a combination thereof.

In the operation of exemplary embodiments, ROV 100 may be operated from remote location 110 by providing first ROV console 30 at a predetermined position, e.g. remote location 110, proximate ROV 100 to be controlled. ROV 100 is configured as described above and may be operatively in communication with ROV wireless data transceiver 10 via umbilical 104 or other data transmission equipment.

Connection between second wireless data transceiver 20 and ROV wireless transceiver 10 may occur automatically upon a predetermined condition, e.g. a failure in a then-currently engaged control or data system, manually, or the like, or a combination thereof.

When and as necessary, first ROV console 30 is operatively connected to second wireless data transceiver 20 and wireless data communications established between second wireless data transceiver 20 and ROV wireless transceiver 10, typically bidirectionally, where such wireless communications may comprise a high latency and/or a low latency wireless communication Referring generally to FIG. 1, in most embodiments the wireless communications between second wireless data transceiver 20 and ROV wireless transceiver 10 comprise control and command data. In certain embodiments, the wireless communications between second wireless data transceiver 20 and ROV wireless transceiver 10 comprise video data, data suitable to effect one or more ROV control functions, or the like, or a combination thereof. Accordingly, once such wireless data communications are established, one or more predetermined ROV functions may be controlled from first ROV console 30 via data communications between second wireless data transceiver 20 and ROV wireless transceiver 10. The ROV control functions may include ROV positioning; control of various ROV equipment such as lighting and video; control of ROV effected controls such as electrical and/or hydraulics, whether for the ROV or a piece of equipment to which the ROV is connected, or the like, or a combination thereof; monitoring such as field monitoring, rig monitoring, BOP monitoring, and the like, or a combination thereof; device controls such as BOP closure, lower marine riser package (LMRP) disconnection, general well support, and the like, or a combination thereof; and/or one or more diagnostics, or the like, or a combination thereof.

In certain embodiments, third wireless data transceiver 22 may be present and located at remote location 110 or at location 112 which is distant from remote location 110. Transmission of wireless data may then be established between third wireless data transceiver 22 and second wireless data transceiver 20 and/or ROV wireless transceiver 10. Third wireless data transceiver 22 may be configured to function act as a backup or ancillary wireless data transceiver.

In a further embodiment, second ROV console 32 may be provided and located at remote location 110 or at location 112. Second ROV console 32 may act as a backup or ancillary ROV console and, either automatically or manually, allowed to assume control of ROV 100.

The foregoing disclosure and description of the inventions are illustrative and explanatory. Various changes in the size, shape, and materials, as well as in the details of the illustrative construction and/or an illustrative method may be made without departing from the spirit of the invention.

We claim:

1. A method for operating a remotely operated vehicle (ROV) from a remote location, comprising:
  a. providing a first remote wireless data transceiver at a first predetermined position proximate an ROV to be controlled, the ROV comprising an ROV data transceiver operatively in communication with an ROV controller;
  b. operatively placing the ROV data transceiver into communication with the first remote wireless data transceiver;
  c. placing a first ROV console into communication with a second wireless data transceiver;
  d. establishing wireless data communications between the second wireless data transceiver and the ROV data transceiver via the first remote wireless data transceiver; and
  e. controlling a predetermined ROV function at the ROV from the first ROV console via the data communications established between the second wireless data transceiver and the first remote wireless data transceiver.

2. The method for operating a remotely operated vehicle (ROV) from a remote location of claim 1, wherein data exchanged using the wireless communications between the second wireless data transceiver and the first remote wireless data transceiver comprise control and command data.

3. The method for operating a remotely operated vehicle (ROV) from a remote location of claim 1, wherein data exchanged using the wireless communications between the second wireless data transceiver and the first remote wireless data transceiver comprise video data.

4. The method for operating a remotely operated vehicle (ROV) from a remote location of claim 1, wherein the first predetermined position proximate the ROV to be controlled comprises a location proximate a rig from where the ROV was deployed, a rig other than the rig from where the ROV was deployed, a non-local vessel, or a shore-based operation.

5. The method for operating a remotely operated vehicle (ROV) from a remote location of claim 1, wherein the first predetermined position proximate an ROV to be controlled comprises a location whose distance from the ROV is a function of data transmission frequencies.

6. The method for operating a remotely operated vehicle (ROV) from a remote location of claim 1, wherein the first predetermined position proximate an ROV to be controlled comprises a location whose distance from the ROV is a function of weather.

7. The method for operating a remotely operated vehicle (ROV) from a remote location of claim 1, wherein the wireless communications established between the second wireless data transceiver and the first remote ROV wireless data transceiver comprises a low latency wireless communication.

8. The method for operating a remotely operated vehicle (ROV) from a remote location of claim 1, wherein the first ROV console is operatively connected to the second wireless data transceiver automatically upon a predetermined condition.

9. The method for operating a remotely operated vehicle (ROV) from a remote location of claim 1, wherein the first ROV console is operatively connected to the second wireless data transceiver manually.

10. The method for operating a remotely operated vehicle (ROV) from a remote location of claim 1, further comprising:
  a. disposing a third wireless data transceiver located at a second predetermined location; and
  b. effecting transmission of wireless data between the third wireless data transceiver and at least one of the second wireless data transceiver and the first remote wireless data transceiver.

11. The method for operating a remotely operated vehicle (ROV) from a remote location of claim 10, wherein the second predetermined location comprises a location that is proximate to the first predetermined location.

12. The method for operating a remotely operated vehicle (ROV) from a remote location of claim 10, wherein the second predetermined location comprises a location distant from the first predetermined location.

13. The method for operating a remotely operated vehicle (ROV) from a remote location of claim 10, wherein the second predetermined location comprises a rig other than a rig from where the ROV was deployed, a non-local vessel, or a shore-based facility.

14. The method for operating a remotely operated vehicle (ROV) from a remote location of claim 10, further comprising:
 a. providing a second ROV console located at the second predetermined location;
 b. placing the second ROV console into communication with the third wireless data transceiver; and
 c. allowing the second ROV console to assume control of the ROV.

15. A system for operating a remotely operated vehicle (ROV) from a remote location, comprising:
 a. an ROV to be controlled, the ROV to be controlled comprising:
  i. an ROV controller; and
  ii. an ROV wireless data transceiver operatively in communication with the ROV controller;
 b. a first wireless data transceiver operatively in communication with the ROV to be controlled;
 c. a second wireless data transceiver disposed at a first predetermined position remote from but proximate to the ROV wireless data transceiver and configured to wirelessly communicate with the ROV wireless data transceiver; and
 d. a first ROV console disposed at the first predetermined position remote from, but operatively in communication with, the ROV wireless data transceiver, the ROV console configured to also be operatively in communication with the second wireless data transceiver.

16. The system for operating a remotely operated vehicle (ROV) from a remote location of claim 15, wherein the first wireless data transceiver and the second wireless data transceiver comprise a low latency wireless data transceiver.

17. The system for operating a remotely operated vehicle (ROV) from a remote location, of claim 15, further comprising a third wireless data transceiver located at a second predetermined location, the third wireless data transceiver configured to operatively communicate with the second wireless data transceiver.

18. The system for operating a remotely operated vehicle (ROV) from a remote location, of claim 15, further comprising a third wireless data transceiver located at a second predetermined location, the third wireless data transceiver configured to operatively communicate with the first wireless data transceiver.

19. The system for operating a remotely operated vehicle (ROV) from a remote location, of claim 18, further comprising a second ROV console operatively in communication with the third wireless data transceiver.

* * * * *